(12) United States Patent
Cook (10) Patent No.: US 12,329,068 B2
(45) Date of Patent: Jun. 17, 2025

(54) REEL ASSEMBLY OF AN AGRICULTURAL HEADER

(71) Applicant: CNH Industrial America LLC, New Holland, PA (US)

(72) Inventor: Joel Timothy Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 888 days.

(21) Appl. No.: 17/434,728

(22) PCT Filed: Feb. 27, 2020

(86) PCT No.: PCT/US2020/020120
§ 371 (c)(1),
(2) Date: Aug. 27, 2021

(87) PCT Pub. No.: WO2020/176739
PCT Pub. Date: Sep. 3, 2020

(65) Prior Publication Data
US 2022/0124981 A1    Apr. 28, 2022

Related U.S. Application Data

(60) Provisional application No. 62/811,198, filed on Feb. 27, 2019.

(51) Int. Cl.
*A01D 57/04* (2006.01)
(52) U.S. Cl.
CPC .................................. *A01D 57/04* (2013.01)
(58) Field of Classification Search
CPC ...... A01D 34/286; A01D 41/02; A01D 41/06; A01D 41/148; A01D 57/04; A01D 57/025; A01D 69/03
See application file for complete search history.

(56) References Cited

U.S. PATENT DOCUMENTS

| 4,835,953 A | 6/1989 | Naaktgeboren et al. |
| 5,752,372 A * | 5/1998 | Buermann ............. A01D 57/04 |
| | | 56/130 |

(Continued)

FOREIGN PATENT DOCUMENTS

| DE | 19508887 A1 | 9/1996 |
| EP | 3305058 A1 | 4/2018 |
| GB | 2195873 A | 4/1988 |

OTHER PUBLICATIONS

International Search Report and Written Opinion for PCT application PCT/US2020/020120, mailed May 29, 2020 (14 pages).

*Primary Examiner* — Adam J Behrens
*Assistant Examiner* — Robert E Pezzuto
(74) *Attorney, Agent, or Firm* — Peter K. Zacharias (57) ABSTRACT

A reel assembly of an agricultural header includes an arm configured to rotatably couple to a frame of the agricultural header, in which the arm has a substantially straight portion. The reel assembly also includes a carriage slidably coupled to the arm and configured to move along the substantially straight portion of the arm, in which the carriage is configured to support a reel of the reel assembly. In addition, the reel assembly includes a cam coupled to the carriage and having a cam surface, and a follower configured to couple to the frame and to engage the cam surface of the cam. The cam surface is configured to control rotation of the arm relative to the frame in response to movement of the carriage along the substantially straight portion of the arm.

20 Claims, 4 Drawing Sheets

(56) References Cited

U.S. PATENT DOCUMENTS

| | | |
|---|---|---|
| 6,442,918 B1 | 9/2002 | Fox |
| 7,222,479 B2 | 5/2007 | Stahl et al. |
| 7,730,707 B2 | 7/2010 | Pietricola et al. |
| 2009/0107094 A1 | 4/2009 | Bich et al. |
| 2014/0295922 A1* | 10/2014 | Buermann ............. A01D 41/06 460/149 |
| 2018/0092305 A1 | 4/2018 | Cook et al. |

* cited by examiner

REEL ASSEMBLY OF AN AGRICULTURAL HEADER

BACKGROUND

The present disclosure relates generally to a reel assembly of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine harvester, the harvesting process may begin by removing a plant from a field, such as by using a header. The header may cut the agricultural crops and transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system. Certain headers include a reel assembly configured to direct the crops cut by the cutter bar assembly toward the belt(s), thereby substantially reducing the possibility of the cut crops falling onto the surface of the field.

Reel assemblies typically include a reel having multiple fingers extending from a central framework. The central framework is driven to rotate such that the fingers move in a generally circular pattern. The fingers are configured to engage the cut crops, thereby urging the cut crops to move toward the belt(s). The reel is typically supported by multiple arms extending from a frame of the header. In addition, the reel assembly may include one or more rotation actuators configured to drive the arms to rotate, thereby adjusting a vertical position of the reel relative to the cutter bar assembly/surface of the field. The reel assembly may also include extension actuators, in which each extension actuator is coupled to a respective arm and configured to drive the reel to move along a length of the respective arm. For example, each arm may include a substantially straight portion, and a carriage may be disposed on the substantially straight portion. The extension actuator is coupled to the arm and to the carriage, and the carriage is coupled to the reel. Accordingly, the extension actuator may drive the carriage to move along the substantially straight portion of the respective arm, thereby driving the reel to move along a substantially linear path relative to the cutter bar assembly.

During certain agricultural operations, the reel may be positioned such that the fingers engage the crops cut by the cutter bar assembly. However, during other agricultural operations (e.g., agricultural operations in which the crops are matted on the surface of the field), the reel may be positioned such that the fingers are positioned proximate to the surface of the field. For example, the rotation actuator(s) may drive the arms to lower the reel relative to the surface of the field. Each extension actuator may then drive the carriage along the substantially straight portion of the respective arm to move the reel along the substantially linear path toward the surface of the field. To ensure that the fingers clear the cutter bar assembly as the reel moves along the substantially linear path, the rotation actuator(s) may position the arms at a transition orientation that facilitates unrestricted movement of the reel along the substantially linear path. Unfortunately, because the substantially linear path is angled at the transition orientation, the fingers of the reel may be positioned a significant distance above the surface of the soil when the reel reaches the end of the substantially linear path. As a result, the effectiveness of the reel in directing crops matted on the surface of the field to the cutter bar assembly may be substantially reduced.

BRIEF DESCRIPTION

In certain embodiments, a reel assembly of an agricultural header includes an arm configured to rotatably couple to a frame of the agricultural header, in which the arm has a substantially straight portion. The reel assembly also includes a carriage slidably coupled to the arm and configured to move along the substantially straight portion of the arm, in which the carriage is configured to support a reel of the reel assembly. In addition, the reel assembly includes a cam coupled to the carriage and having a cam surface, and a follower configured to couple to the frame and to engage the cam surface of the cam. The cam surface is configured to control rotation of the arm relative to the frame in response to movement of the carriage along the substantially straight portion of the arm.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
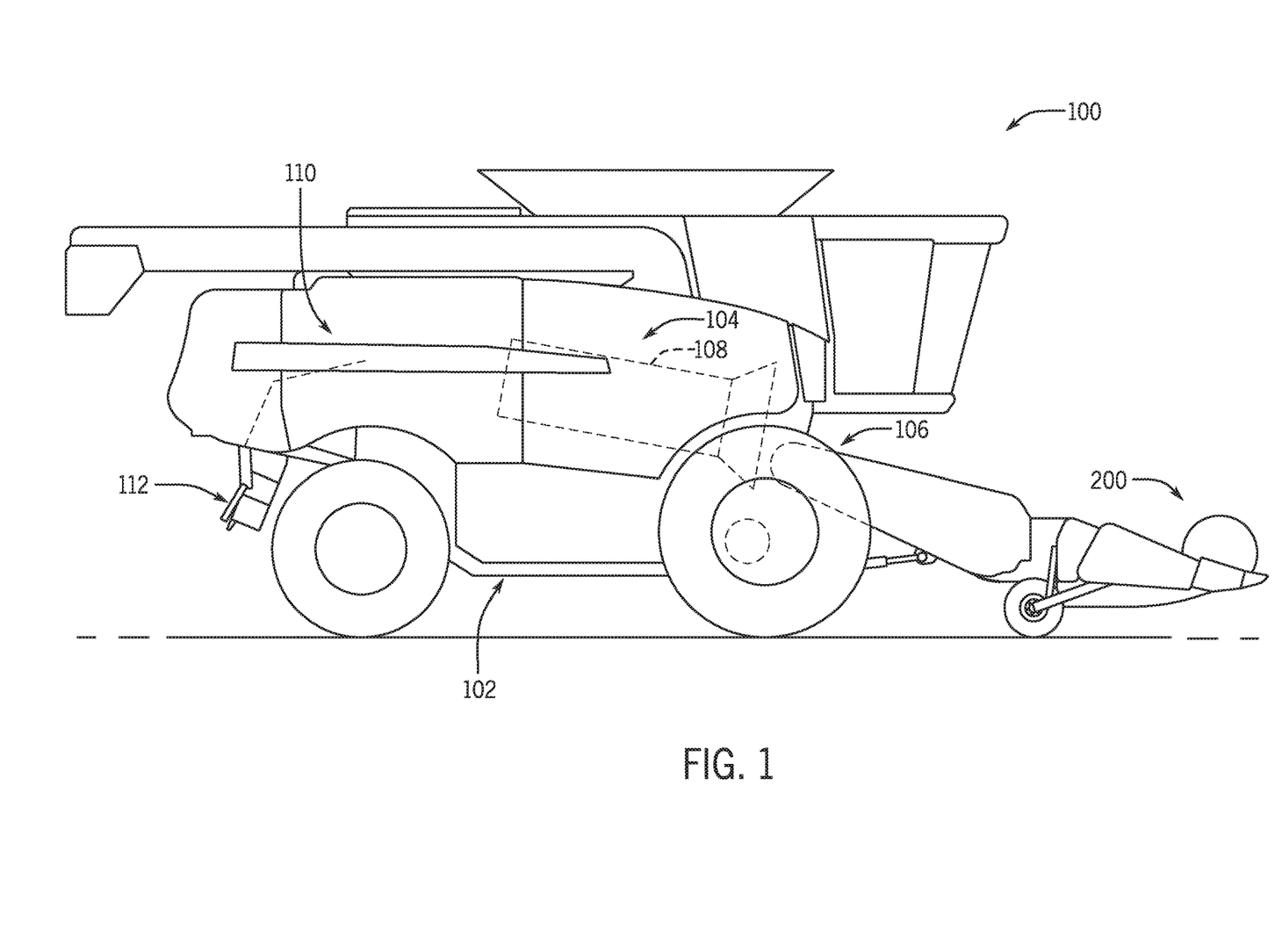
FIG. 1 is a side view of an embodiment of an agricultural harvester having a header.

Turning to the drawings, FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. In certain embodiments, the cutter bar assembly is configured to flex along a width of the header to enable the cutter bar assembly to substantially follow the contours of the field. In such embodiments, the cutter bar assembly is supported by multiple longitudinally extending arms distributed along the width of the header. Each arm is pivotally mounted to a frame of the header, thereby enabling the cutter bar assembly to flex. In certain embodiments, the pivoting movement of each arm may be blocked to establish a substantially rigid cutter bar (e.g., for certain field conditions, for harvesting certain types of crops, etc.).

The header 200 includes a reel assembly configured to urge crops cut by the cutter bar assembly to belts that convey the cut crops toward the inlet 106 of the agricultural crop processing system 104. As discussed in detail below, the reel assembly includes a reel having multiple fingers extending from a central framework. The central framework is driven to rotate such that the fingers engage the cut crops and urge the cut crops toward the belts. The reel assembly also includes multiple arms configured to support the reel. The arms are rotatably coupled to the frame of the header to facilitate vertical movement of the reel relative to the cutter bar assembly/surface of the field.

In certain embodiments, each arm has a substantially straight portion. In addition, the reel assembly includes multiple carriages, in which each carriage is slidably coupled to a respective arm and configured to move along the substantially straight portion of the arm. Each carriage is rotatably coupled to the reel, thereby enabling the reel to rotate relative to the arms. Furthermore, the reel assembly includes one or more cams, in which each cam is coupled (e.g., non-rotatably coupled) to a respective carriage and has a cam surface. The reel assembly also includes one or more followers, in which each follower is coupled to the frame (e.g., via a rotation actuator) and configured to engage the cam surface of a respective cam. The cam surface is configured to control rotation of the respective arm relative to the frame in response to movement of the carriage along the substantially straight portion of the arm. For example, the cam surface may be configured to enable/cause the arm to rotate downwardly (e.g., such that the reel moves downwardly relative to the cutter bar assembly/surface of the field) as the carriage moves away from the follower along the substantially straight portion of the arm.

During certain agricultural operations, the reel may be positioned at a first location that enables the fingers to engage the crops cut by the cutter bar assembly, thereby directing the cut crops to the belts. However, during other agricultural operations (e.g., agricultural operations in which the crops are matted on the surface of the field), the reel may be positioned at a second location that enables the fingers to engage the crops on the surface of the field (e.g., field surface). To transition the reel between the first location and the second location, the arms may be rotated to a transition orientation. Each carriage may then be moved along the substantially straight portion of the respective arm to move the reel along a path toward the surface of the field. The transition orientation may be selected such that the fingers do not contact the cutter bar assembly as the reel moves along the path toward the surface of the field. A profile of each cam surface may be configured to enable/cause the respective arm to rotate downwardly (e.g., such that the reel moves downwardly relative to the cutter bar assembly/surface of the field) once the fingers (e.g., the lower-most fingers) pass/reach/substantially reach the cutter bar assembly (e.g., as the carriage moves away from the follower along the substantially straight portion of the arm). As a result, a path may be established that causes the fingers to be positioned closer to the surface of the field while the reel is at the second location (e.g., as compared to a reel that follows a substantially linear path toward the surface of the field), thereby enhancing the effectiveness of the reel assembly.

Figure 2:
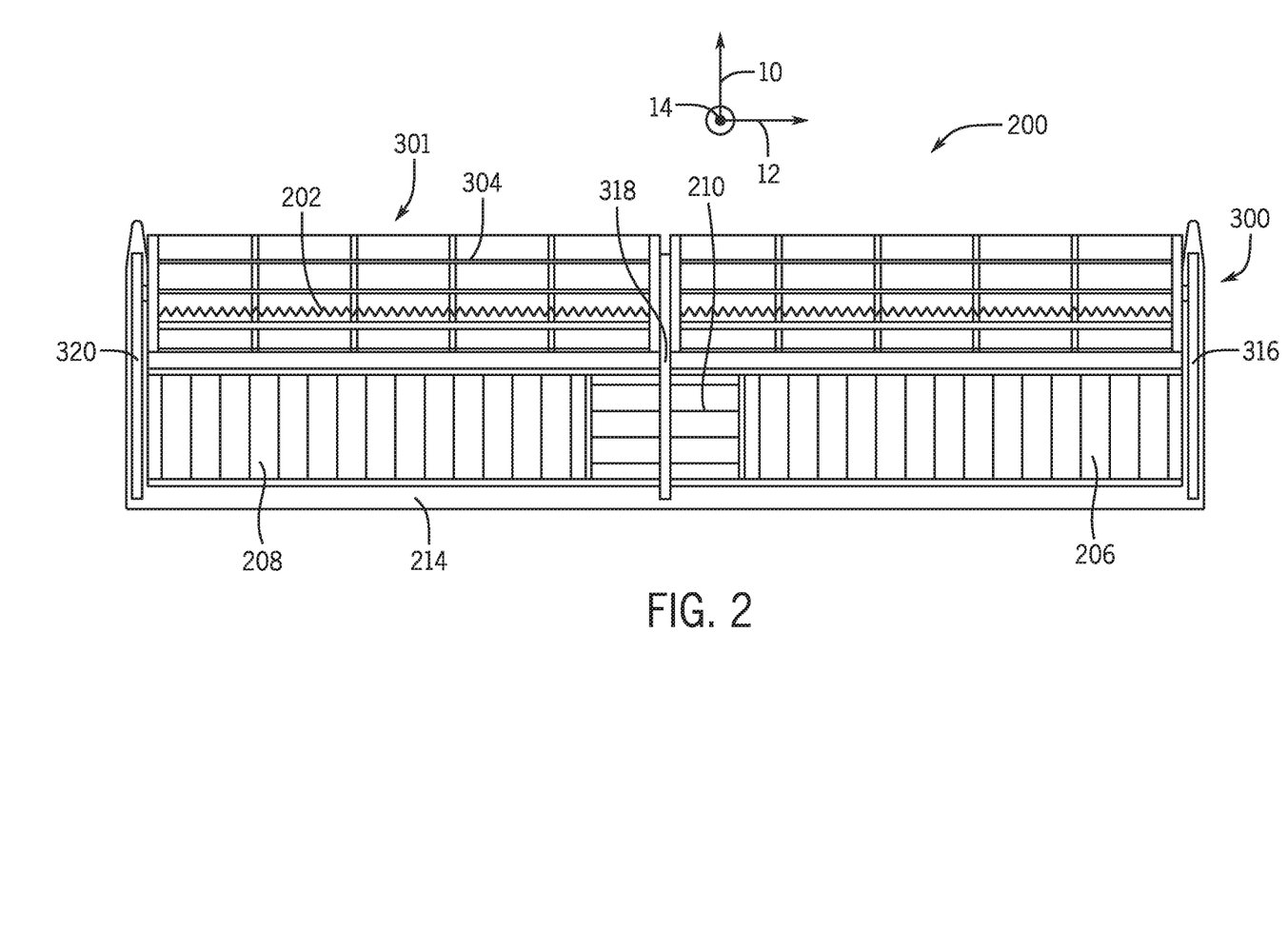
FIG. 2 is a top view of an embodiment of a header that may be employed within the agricultural harvester of FIG. 1.

FIG. 2 is a top view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). The cutter bar assembly includes a blade support, a stationary guard assembly, and a moving blade assembly. The moving blade assembly is fixed to the blade support (e.g., above the blade support along a vertical axis 14 of the header 200), and the blade support/moving blade assembly is driven to oscillate relative to the stationary guard assembly. In certain embodiments, the blade support/moving blade assembly is driven to oscillate by a driving mechanism positioned at the lateral center of the header. However, in other embodiments, the blade support/moving blade assembly may be driven by another suitable mechanism (e.g., located at any suitable position on the header). As the harvester is driven through the field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10.

In the illustrated embodiment, the crops cut by the cutter bar assembly 202 are directed toward the belts by a reel assembly 300, thereby substantially reducing the possibility of the cut crops falling onto the surface of the field. The reel assembly 300 includes a reel 301 having multiple fingers extending from a central framework 304. The central framework 304 is driven to rotate such that the fingers move (e.g., in a generally circular pattern). The fingers are configured to engage the cut crops and urge the cut crops toward the belts. The cut crops that contact the top surface of the lateral belts are driven laterally inwardly to the longitudinal belt due to the movement of the lateral belts. In addition, cut crops that contact the longitudinal belt 210 and the cut crops provided to the longitudinal belt by the lateral belts are driven rearwardly along the longitudinal axis 10 due to the movement of the longitudinal belt 210. Accordingly, the belts move the cut agricultural crops through an opening in the header 200 to the inlet of the agricultural crop processing system.

In the illustrated embodiment, the cutter bar assembly 202 is flexible along the width of the header 200 (e.g., the extent of the header 200 along the lateral axis 12). The cutter bar assembly 202 is supported by multiple arm assemblies distributed along the width of the header 200 (e.g., along the lateral axis 12 of the header 200). Each arm assembly is mounted to a frame 214 of the header 200 and includes an arm configured to rotate and/or move along the vertical axis 14 relative to the frame. Each rotatable/movable arm is coupled to the cutter bar assembly 202, thereby enabling the cutter bar assembly 202 to flex during operation of the harvester. The flexible cutter bar assembly may follow the contours of the field, thereby enabling the cutting height (e.g., the height at which each crop is cut) to be substantially constant along the width of the header 200 (e.g., the extent of the header 200 along the lateral axis 12). However, in other embodiments, the cutter bar assembly may be substantially rigid along the width of the header, or the cutter bar assembly may be configured to transition between a flexible state and a substantially rigid state.

In the illustrated embodiment, the reel 301 is supported by a first arm 316, a second arm 318, and a third arm 320. While the reel 301 is support by three arms in the illustrated embodiment, in other embodiments, the reel may be supported by more or fewer arms. As discussed in detail below, each arm is pivotally coupled to the frame 214 by a respective pivot joint. Each pivot joint is configured to enable the respective arm to pivot about the lateral axis 12 of the agricultural header 200. Furthermore, the reel assembly 300 includes one or more rotation actuators coupled to one or more respective arms. For example, in certain embodiments, a first rotation actuator may be coupled to the first arm 316, a second rotation actuator may be coupled to the second arm 318, and a third rotation actuator may be coupled to the third arm 320. However, in other embodiments, at least one arm may not be coupled to a respective rotation actuator. Each rotation actuator is coupled to the frame 214 and configured to drive the respective arm to rotate about the lateral axis 12 relative to the frame 214, thereby controlling a position of the reel 301 relative to the frame 214 along the vertical axis 14 (e.g., to control engagement of the fingers of the reel with the cut agricultural crops).

In addition, as discussed in detail below, each arm has a substantially straight portion, and a carriage is slidably coupled to the arm and configured to move along the substantially straight portion. Each carriage is rotatably coupled to the reel 301, thereby enabling the reel 301 to rotate relative to the arms. Furthermore, the reel assembly 300 includes extension actuators, in which each extension actuator is coupled to a respective arm and to a respective carriage. Each extension actuator is configured to drive the carriage along the substantially straight portion of the arm, thereby moving the reel 301 along the longitudinal axis 10 relative to the frame 214.

Furthermore, the reel assembly 300 includes cams and followers. Each cam is coupled (e.g., non-rotatably coupled) to a respective carriage and includes a cam surface. In addition, each follower is coupled to the frame 214 (e.g., via a rotation actuator) and configured to engage the cam surface of a respective cam. Each cam surface is configured to control rotation of a respective arm relative to the frame 214 in response to movement of the respective carriage along the substantially straight portion of the arm. For example, the cam surface may be configured to enable the arm to rotate downwardly (e.g., such that the reel 301 moves downwardly along the vertical axis 14 relative to the cutter bar assembly 202/surface of the field) as the carriage moves away from the follower along the substantially straight portion of the arm.

During certain agricultural operations, the reel 301 may be positioned at a first location that enables the fingers to engage the crops cut by the cutter bar assembly 202, thereby directing the cut crops to the belts. However, during other agricultural operations (e.g., agricultural operations in which the crops are matted on the surface of the field), the reel 301 may be positioned at a second location that enables the fingers to engage the crops on the surface of the field. To transition the reel 301 between the first location and the second location, the rotation actuators may drive the arms to rotate from the first orientation (e.g., orientation that positions the reel 301 at the first location) to a second (e.g., transition) orientation (e.g., orientation that enables the reel 301 to move toward the second location). The extension actuators may then drive the respective carriages to move along the substantially straight portions of the respective arms, thereby moving the reel 301 along a path toward the surface of the field. The second orientation may be selected such that the fingers do not contact the cutter bar assembly 202 as the reel 301 moves along the path toward the surface of the field. A profile of the cam surface of each cam may be configured to enable/cause the respective arm to rotate downwardly (e.g., such that the reel 301 moves downwardly along the vertical axis 14 relative to the cutter bar assembly 202/surface of the field) once the fingers (e.g., the lowermost fingers) pass/reach/substantially reach the cutter bar assembly 202 (e.g., as the respective carriage moves away from the follower along the substantially straight portion of the respective arm). As a result, a path may be established that causes the fingers to be positioned closer to the surface of the field while the reel 301 is at the second location (e.g., as compared to a reel that follows a substantially linear path toward the surface of the field), thereby enhancing the effectiveness of the reel assembly 300 at directing crops matted on the surface of the field toward the cutter bar assembly 202.

Figure 3:
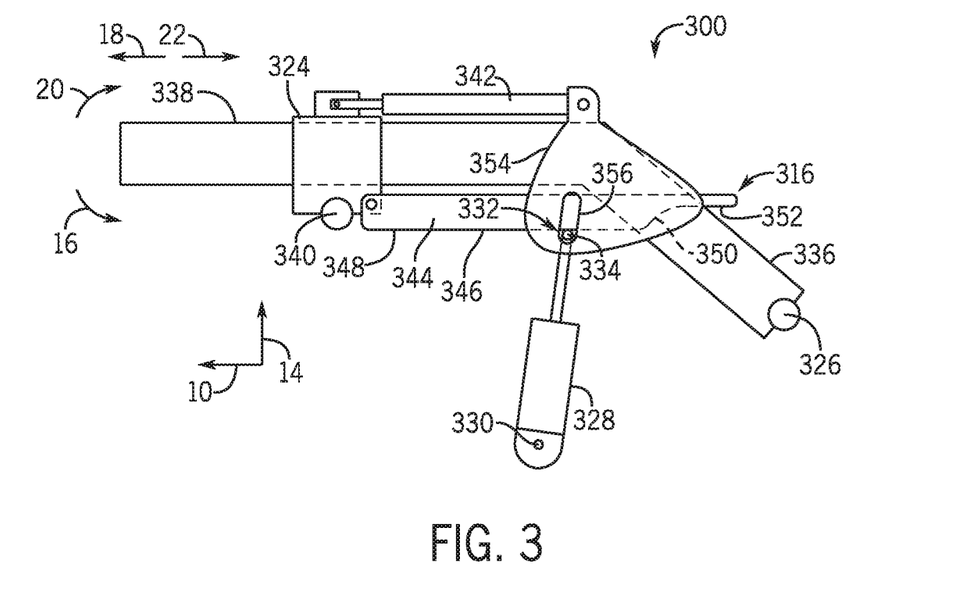
FIG. 3 is a side view of an embodiment of a reel assembly that may be employed within the header of FIG. 2, in which a carriage of the reel assembly is in an inward position.

FIG. 3 is a side view of an embodiment of a reel assembly 300 that may be employed within the header of FIG. 2, in which a carriage 324 of the reel assembly 300 is in an inward position (e.g., first position). In the illustrated embodiment, the first arm 316 of the reel assembly 300 is configured to rotatably couple to the frame of the header via a pivot joint 326. As previously discussed, the pivot joint 326 enables the first arm 316 to pivot about the lateral axis relative to the header frame. In addition, the reel assembly 300 includes a rotation actuator 328 configured to drive the first arm 316 to rotate relative to the frame, thereby adjusting the position of the reel relative to the frame. A first end 330 of the rotation actuator 328 is coupled (e.g., pivotally coupled) to the frame of the header, and a second end 332 of the rotation actuator 328 is coupled to a follower 334. In the illustrated embodiment, the rotation actuator 328 includes a hydraulic cylinder. However, in other embodiments, the rotation actuator may include other and/or additional actuator(s), such as pneumatic actuator(s), electromechanical actuator(s), etc.

In the illustrated embodiment, the first arm 316 has a mounting portion 336 and a substantially straight portion 338. The mounting portion 336 is configured to rotatably couple to the header frame via the pivot joint 326, and the carriage 324 is slidably coupled to the first arm 316 at the substantially straight portion 338. The carriage 324 is configured to move along the substantially straight portion 338 of the first arm 316, and the carriage is configured to support the reel of the reel assembly 300. In certain embodiments, the carriage 324 substantially or completely surrounds the substantially straight portion 338 to slidably couple the carriage 324 to the first arm 316. However, in other embodiments, the carriage may be slidably coupled to the substantially straight portion of the arm by any other suitable sliding connection (e.g., rails, tongue/groove, etc.). In certain embodiments, one or more bushing and/or bearing may be disposed between the substantially straight portion of the first arm and the carriage to facilitate movement of the carriage along the substantially straight portion of the first arm. Furthermore, in the illustrated embodiment, the reel is rotatably coupled to the carriage 324 by a pivot joint 340. However, in other embodiments, the reel may be rotatably coupled to the carriage by any other suitable assembly (e.g., bearing, etc.).

In the illustrated embodiment, the reel assembly 300 includes an extension actuator 342 coupled to the first arm 316 (e.g., via a pivot joint) and to the carriage 324 (e.g., via a pivot joint). The extension actuator 342 is configured to drive the carriage 324 to move along the substantially straight portion 338 of the first arm 316. For example, while the first arm 316 is in the illustrated first orientation (e.g., an orientation that positions the reel at the first location to direct cut crops to the belts), the extension actuator 342 may drive the carriage 324 to move substantially along the longitudinal axis 10. In the illustrated embodiment, the extension actuator 342 includes a hydraulic cylinder. However, in other embodiments, the extension actuator may include other and/or additional actuator(s), such as pneumatic actuator(s), electromechanical actuator(s), etc.

In the illustrated embodiment, the reel assembly 300 includes a cam 344 coupled (e.g., rigidly coupled) to the carriage 324. Accordingly, the cam 344 is configured to move with the carriage 324 as the carriage 324 is driven to move along the substantially straight portion 338 of the first arm 316 by the extension actuator 342. The cam 344 has a cam surface 346 configured to control rotation of the first arm 316 about the pivot joint 326 (e.g., relative to the header frame) in response to movement of the carriage 324 along the substantially straight portion 338 of the first arm 316. In the illustrated embodiment, the follower 334, which is coupled to the second end 332 of the rotation actuator 328, is configured to engage the cam surface 346 of the cam 344. In other embodiments, the rotation actuator may be omitted, and the follower may be coupled to the frame of the header by another suitable assembly (e.g., a rod pivotally coupled to the header frame, etc.). In the illustrated embodiment, the cam surface 346 is configured to engage the follower 334 due to the influence of gravity on the first arm 316. However, in other embodiments, the follower may be disposed within a slot of the cam, and the cam surface may be formed on the top and/or bottom surfaces of the slot. Furthermore, in certain embodiments, the follower and cam surface may be arranged in any suitable configured to control rotation of the first arm relative to the frame in response to movement of the carriage along the substantially straight portion of the first arm.

In the illustrated embodiment, the cam surface 346 has a first substantially flat portion 348 (e.g., first portion), a sloped portion 350, and a second substantially flat portion 352 (e.g., second portion). The first substantially flat portion 348 is positioned to engage the follower 334 while the carriage 324 is in a first position (e.g., inward position), as illustrated, along the substantially straight portion 338 of the first arm 316. With the carriage 324 in the first position and the first arm 316 angled at the first orientation, the reel is positioned at the first location, thereby enabling the fingers to direct crops cut by the cutter bar assembly to the belts of the header. Furthermore, the sloped portion 350 of the cam surface 346 is positioned to engage the follower 334 while the carriage 324 is in a second position along the substantially straight portion 338 of the first arm 316. As illustrated, the first position is closer to the follower 334 than the second position. In addition, the second substantially flat portion 352 is positioned to engage the follower 334 while the carriage 324 is in a third position (e.g., outward position) along the substantially straight portion 338 of the first arm 316. As illustrated, the second position is closer to the follower 334 than the third position. While the sloped portion 350 has a curved shape in the illustrated embodiment, in other embodiments, the sloped portion may have another suitable shape (e.g., substantially linear, multiple curves, etc.).

In the illustrated embodiment, the sloped portion 350 of the cam surface 346 is configured to enable/cause the first arm 316 to rotate downwardly (e.g., in a downward rotational direction 16 relative to the header frame) as the carriage 324 moves away from the follower 334 (e.g., in an outward direction 18) along the substantially straight portion 338 of the first arm 316. Accordingly, as the carriage 324 moves away from the follower 334 along the substantially straight portion 338 of the first arm 316, the reel moves downwardly along the vertical axis 14. In addition, the sloped portion 350 of the cam surface 346 is configured to drive the first arm 316 to rotate upwardly (e.g., in an upward rotational direction 20 relative to the header frame) as the carriage 324 moves toward the follower 334 (e.g., in an inward direction 22) along the substantially straight portion 338 of the first arm 316. Accordingly, as the carriage 324 moves toward the follower 334 along the substantially straight portion 338 of the first arm 316, the reel moves upwardly along the vertical axis 14.

To transition the reel from the first location, as illustrated, to the second location, the rotation actuator 328 may drive the first arm 316 to rotate in the downward direction 16 from the illustrated first orientation to the second (e.g., transition) orientation (e.g., orientation that enables the reel to move toward the second location without contacting the cutter bar assembly). While the first arm 316 is angled at the second orientation, the carriage 324 remains at the first position, such that the follower 334 engages the first substantially flat portion 348 of the cam surface 346. The extension actuator 342 may then drive the carriage 324 to move along the substantially straight portion 338 of the first arm 316 from the first position to the third position, thereby moving the reel along a path toward the surface of the field. The profile of the cam surface 346 is configured to enable/cause the first arm 316 to rotate in the downward direction 16 (e.g., from a first angle, corresponding to the second orientation, to a second angle) once the fingers (e.g., the lower-most fingers) pass/reach/substantially reach the cutter bar assembly (e.g., as the carriage moves in the outward direction 18). For example, the sloped portion 350 of the cam surface 346 may be positioned such that the first arm 316 rotates in the downward direction 16 (e.g., from the first angle to the second angle) once the fingers (e.g., the lower-most fingers) pass/reach/substantially reach the cutter bar assembly. With the carriage 324 located in the third position, the follower 334 engages the second substantially flat portion 352 of the cam surface 346, thereby positioning the reel proximate to the surface of the field along the vertical axis 14. Based on the profile of the cam surface, the second orientation of the first arm 316 may be selected such that the fingers do not contact the cutter bar assembly as the reel moves along the path toward the surface of the field. As a result of the path established by the cam surface 346, the fingers may be positioned closer to the surface of the field while the reel is at the second location (e.g., as compared to a reel that follows a substantially linear path toward the surface of the field), thereby enhancing the effectiveness of the reel assembly 300 at directing crops matted on the surface of the field toward the cutter bar assembly.

In the illustrated embodiment, the reel assembly 300 includes a support 354 coupled to the first arm 316 and configured to enhance the structural rigidity of the first arm 316. As illustrated, the support 354 has a slot 356, the follower 334 is disposed within the slot 356, and the slot 356 is configured to enable rotation of the first arm 316 relative to the header frame through a range of motion (e.g., a range of motion of the arm cause by interaction between the cam and the follower). While the illustrated support includes a slot, in other embodiments, the support may have another suitable feature (e.g., notch, etc.) configured to enable rotation of the first arm through the range of motion. Furthermore, in certain embodiments, the support may be omitted.

While the cam surface of the illustrated cam has a first substantially flat portion, a sloped portion, and a second substantially flat portion, in other embodiments, the cam surface may have any other suitable profile that establishes a suitable reel path (e.g., a reel path that causes the fingers to avoid contact with the cutter bar assembly and positions the reel closer to the surface of the field than a substantially linear path). In certain embodiments, the cam may be interchangeable with another cam having a cam surface with a different profile (e.g., the cam may be removably coupled to the carriage). For example, an operator may have multiple cams each having a different profile, and the operator may select a desired cam for a particular agricultural operation and/or for particular operating conditions. While the components of the reel assembly (e.g., the cam, the follower, the rotation actuator, the extension actuator, etc.) are described above with reference to the first arm, the reel assembly may include other similar (e.g., substantially the same) components associated with one or more other arms to control movement of the reel between the first location and the second location. Furthermore, in certain embodiments, certain components of the reel assembly may not be associated with the one or more other arms (e.g., the cam/follower assembly may be omitted from at least one arm, the rotation actuator may be omitted from at least one arm, etc.).

Figure 4:
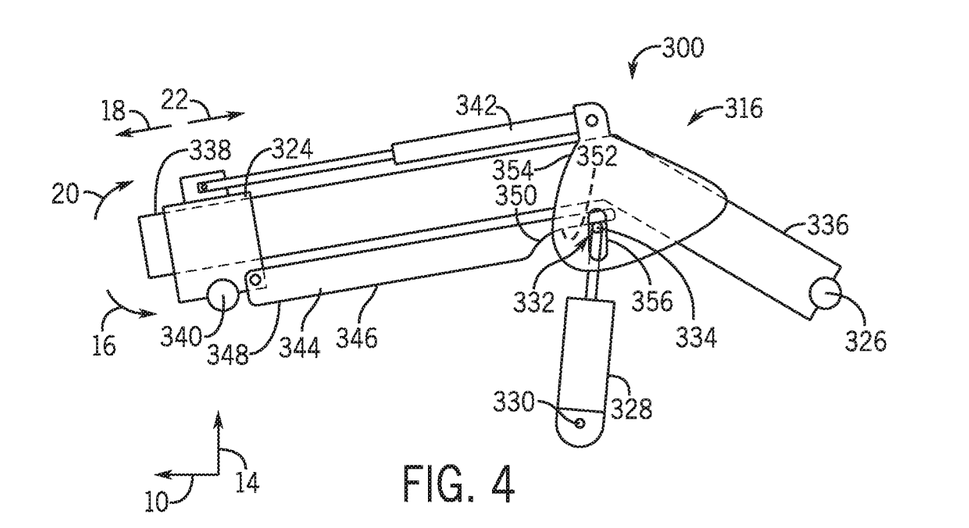
FIG. 4 is a side view of the reel assembly of FIG. 3, in which the carriage is in an outward position.

FIG. 4 is a side view of the reel assembly 300 of FIG. 3, in which the carriage 324 is in an outward position (e.g., third position). As illustrated, with the carriage 324 in the third position, the follower 334 engages the second substantially flat portion 352 of the cam surface 346. As previously discussed, to transition the reel from the first location to the second location, the rotation actuator 328 rotates the first arm 316 in the downward rotational direction 16 to the second orientation. The extension actuator 342 then drives the carriage 324 to the third position, as illustrated. Due to the profile of the cam surface 346, the first arm 316 rotates in the downward rotational direction 16 as the carriages 324 moves along the substantially straight portion 338 of the first arm 316 in the outward direction 18. As a result, the fingers of the reel are positioned closer to the surface of the field, as compared to moving the reel along a substantially straight path.

To transition the reel from the second location to the first location, the extension actuator 342 drives the carriage 324 from the third position, as illustrated, to the first position, as shown in FIG. 3, along the inward direction 22. Due to the profile of the cam surface 346, the first arm 316 rotates in the upward rotational direction 20 as the carriages 324 moves along the substantially straight portion 338 of the first arm 316 in the inward direction 22. For example, the profile of the cam surface 346 may be configured to drive the first arm 316 in the upward rotational direction 20 before the fingers reach the cutter bar assembly, thereby substantially reducing or eliminating the possibility of contact between the fingers and the cutter bar assembly as the carriage 324 moves along the substantially straight portion 338 of the first arm 316 between the illustrated third position and the first position. Once the carriage 324 is in the first position, the rotation actuator 328 may drive the first arm 316 to rotate in the upward rotational direction 20 until the first arm 316 is angled at the first orientation. With the carriage 324 at the first position and the first arm 316 at the first orientation, the reel is positioned at the first location, thereby enabling the reel to direct crops cut by the cutter bar assembly to the belts.

During the transition of the reel from the first location to the second location, the rotation actuator drives the arm to rotate before the extension actuator drives the carriage to move along the substantially straight portion of the arm. However, in other embodiments, the rotation actuator and the extension actuator may operate concurrently. For example, the extension actuator may drive the carriage to move along the substantially straight portion of the arm while the rotation actuator drives the arm to rotate. Similarly, during the transition of the reel from the second location to the first location, the extension actuator drives the carriage to move along the substantially straight portion of the arm before the rotation actuator drives the arm to rotate. However, in other embodiments, the rotation actuator and the extension actuator may operate concurrently. For example, the rotation actuator may drive the arm to rotate while the extension actuator drives the carriage to move along the substantially straight portion of the arm. Furthermore, if transitioning the reel to another location (e.g., instead of the first location or the second location) is desired, only one actuator (e.g., the rotation actuator or the extension actuator) may operate to move the reel.

During certain agricultural operations and/or in certain operating conditions, the reel may be positioned at the first location while each arm is in the second (e.g., transition) orientation and each carriage is in the first position. In such agricultural operations/operating conditions, the reel may be transitioned from the first location to the second location by moving each carriage along the substantially straight portion of the respective arm from the first position to the third position, thereby moving the reel along a path toward the surface of the field. As such, the reel may be transitioned between the first and second locations via operation of the extension actuator(s) alone (e.g., without operation of the rotation actuator(s)).

Figure 5:
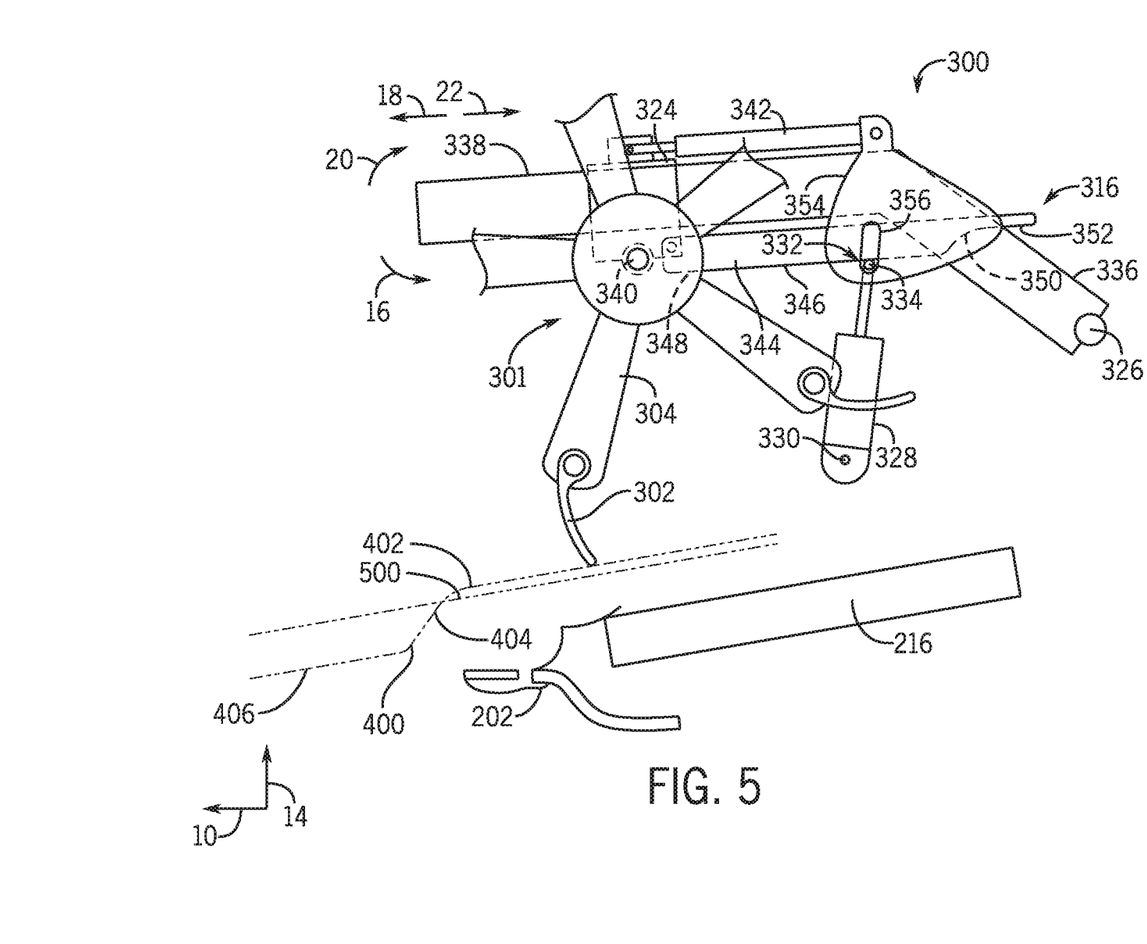
FIG. 5 is a side view of the reel assembly of FIG. 3, illustrating a path of a reel of the reel assembly.

FIG. 5 is a side view of the reel assembly 300 of FIG. 3, illustrating a path 400 of the fingers 302 (e.g., the lower-most fingers) of the reel 301 of the reel assembly 300. As previously discussed, the cutter bar assembly 202 is supported by arms 216, which are pivotally coupled to the frame of the header. Furthermore, the profile of the cam surface is configured to enable/cause the first arm 316 to rotate downwardly, such that the reel 301 moves downwardly relative to the cutter bar assembly 202/surface of the field, once the fingers 302 (e.g., the lower-most fingers) pass/reach/substantially reach the cutter bar assembly 202 as the carriage 324 moves away from the follower 334 along the substantially straight portion 338 of the first arm 316. As illustrated, the path 400 of the fingers 302 has a first substantially flat portion 402, a sloped portion 404, and a second substantially flat portion 406. The fingers 302 move along the first substantially flat portion 402 while the follower 334 engages the first substantially flat portion 348 of the cam surface 346, the fingers 302 move along the sloped portion 404 while the follower 334 engages the sloped portion 350 of the cam surface 346, and the fingers 302 move along the second substantially flat portion 406 while the follower 334 engages the second substantially flat portion 352 of the cam surface 346. Due to the profile of the cam surface, the fingers 302 (e.g., the lower-most fingers) avoid contact with the cutter bar assembly 202 as the fingers 302 move along the path 400. In addition, due to the profile of the cam surface, the fingers 302 (e.g., the lower-most fingers) may be positioned closer to the surface of the field while the reel is in the second location (e.g., as compared to a reel that follows a substantially linear path 500 that enables the fingers to clear the cutter bar assembly as the reel moves toward the surface of the field), thereby enhancing the effectiveness of the reel assembly 300.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reel assembly of an agricultural header, comprising:
an arm configured to rotatably couple to a frame of the agricultural header, wherein the arm has a substantially straight portion;
a carriage slidably coupled to the arm and configured to move along the substantially straight portion of the arm, wherein the carriage is configured to support a reel of the reel assembly;
a cam coupled to the carriage and having a cam surface; and
a follower configured to couple to the frame and to engage the cam surface of the cam, wherein the cam surface is configured to control rotation of the arm relative to the frame in response to movement of the carriage along the substantially straight portion of the arm;
wherein the cam surface is configured to cause the arm to rotate downwardly as the carriage moves away from the follower along the substantially straight portion of the arm.

2. The reel assembly of claim 1, comprising an extension actuator coupled to the arm and to the carriage, wherein the extension actuator is configured to drive the carriage to move along the substantially straight portion of the arm.

3. The reel assembly of claim 1, comprising a support coupled to the arm, wherein the support has a slot, the follower is disposed within the slot, and the slot is configured to enable rotation of the arm relative to the frame through a range of motion.

4. The reel assembly of claim 1, comprising a rotation actuator coupled to the follower, wherein the follower is configured to couple to the frame via the rotation actuator, and the rotation actuator is configured to move the follower to drive the arm to rotate relative to the frame.

5. The reel assembly of claim 1, wherein the cam surface is configured to drive the arm to rotate upwardly as the carriage moves toward the follower along the substantially straight portion of the arm.

6. The reel assembly of claim 1, wherein the cam surface has a substantially flat portion and a sloped portion.

7. The reel assembly of claim 6, wherein the substantially flat portion is positioned to engage the follower while the carriage is in a first position along the substantially straight portion of the arm, the sloped portion is positioned to engage the follower while the carriage is in a second position along the substantially straight portion of the arm, and the first position is closer to the follower than the second position.

8. The reel assembly of claim 7, wherein the sloped portion is configured to cause the arm to rotate downwardly as the carriage moves away from the follower along the substantially straight portion of the arm.

9. An agricultural header, comprising:
a frame;
a reel assembly, comprising:
an arm rotatably coupled to the frame, wherein the arm has a substantially straight portion;
a carriage slidably coupled to the arm and configured to move along the substantially straight portion of the arm;
a reel rotatably coupled to the carriage;
a cam coupled to the carriage and having a cam surface; and a follower coupled to the frame, wherein the follower is configured to engage the cam surface, and the cam surface is configured to control rotation of the arm relative to the frame in response to movement of the carriage along the substantially straight portion of the arm;

wherein the cam surface is configured to cause the arm to rotate downwardly as the carriage moves away from the follower along the substantially straight portion of the arm.

10. The agricultural header of claim 9, wherein the reel assembly comprises a rotation actuator coupled to the frame and to the follower, such that the follower is coupled to the frame via the rotation actuator, and the rotation actuator is configured to move the follower to drive the arm to rotate relative to the frame.

11. The agricultural header of claim 9, wherein the reel assembly comprises a support coupled to the arm, the support has a slot, the follower is disposed within the slot, and the slot is configured to enable rotation of the arm relative to the frame through a range of motion.

12. The agricultural header of claim 9, wherein the cam surface is configured to drive the arm to rotate upwardly as the carriage moves toward the follower along the substantially straight portion of the arm.

13. The agricultural header of claim 9, wherein the cam surface has a substantially flat portion and a sloped portion.

14. The agricultural header of claim 13, wherein the substantially flat portion is positioned to engage the follower while the carriage is in a first position along the substantially straight portion of the arm, the sloped portion is positioned to engage the follower while the carriage is in a second position along the substantially straight portion of the arm, and the first position is closer to the follower than the second position.

15. The agricultural header of claim 14, wherein the sloped portion is configured to cause the arm to rotate downwardly as the carriage moves away from the follower along the substantially straight portion of the arm.

16. A reel assembly of an agricultural header, comprising:
an arm configured to rotatably couple to a frame of the agricultural header, wherein the arm has a substantially straight portion;
a carriage slidably coupled to the arm and configured to move along the substantially straight portion of the arm, wherein the carriage is configured to support a reel of the reel assembly;
a cam coupled to the carriage and having a cam surface; and
a follower configured to couple to the frame and to engage the cam surface of the cam, wherein the cam surface has a first portion and a second portion, the first portion is positioned to engage the follower in response to movement of the carriage to an inward position along the substantially straight portion of the arm, the second portion is positioned to engage the follower in response to movement of the carriage to an outward position along the substantially straight portion of the arm, the cam surface is configured to cause the arm to rotate downwardly to a first angle relative to the frame first as the carriage moves from the inward position to the outward position, and the cam surface is configured to drive the arm to rotate upwardly to a second angle relative to the frame, different than the first angle, as the carriage moves from the outward position to the inward position.

17. The reel assembly of claim 16, comprising an extension actuator coupled to the arm and to the carriage, wherein the extension actuator is configured to drive the carriage to move along the substantially straight portion of the arm.

18. The reel assembly of claim 16, wherein the cam surface has a sloped portion that transitions between the first portion and the second portion.

19. The reel assembly of claim 16, comprising a rotation actuator coupled to the follower, wherein the follower is configured to couple to the frame via the rotation actuator, and the rotation actuator is configured to move the follower to drive the arm to rotate relative to the frame.

20. The reel assembly of claim 16, comprising a support coupled to the arm, wherein the support has a slot, the follower is disposed within the slot, and the slot is configured to enable rotation of the arm relative to the frame through a range of motion.

* * * * *